Patented Nov. 2, 1943

2,333,367

UNITED STATES PATENT OFFICE 2,333,367

METHOD OF CONDITIONING PAINTS

Alwin C. Eide, Columbus, Ohio, and Harlan A. Depew, Haddonfield, N. J., assignors to American Zinc, Lead & Smelting Company, St. Louis, Mo., a corporation of Maine No Drawing. Application January 29, 1941, Serial No. 376,534

6 Claims. (Cl. 106—296)

This invention relates to nonreactive grinding liquids and more particularly to grinding liquids used in the manufacture of paints and enamels which are nonreactive with the pigments of the paint or enamel.

More particularly still this invention relates to grinding liquids used in the manufacture of paints and enamels which are nonreactive with the pigments ground therein and to the resulting paint or enamel products.

Heretofore when pigments have been ground in reactive grinding liquids, a number of objectionable results have occurred. At the time of grinding the reaction between the grinding liquid and the pigment may be such as to produce a paint which is too thick and difficult to grind. If the reaction does not take place at the time of grinding the reaction will, in all probability, take place later to such an extent that the paint or enamel is too thick for use when reaching the consumer. In other cases where thickening has not occurred a cloudiness, known as "hazing," will appear in the glossy surface of the paint or enamel after application. This "hazing" may appear almost immediately after application of the paint or enamel or may take place after some exposure. It has also been noted that certain types of reactive grinding liquids employed with zinc oxide as the pigment do not produce as durable paints as less reactive vehicles.

The reaction between the reactive grinding liquid and the pigment is particularly noticeable when zinc oxide is used as the pigment.

It is therefore an object of the present invention to provide nonreactive grinding liquids for use with zinc oxide pigments or reactive grinding liquids for use with zinc oxide pigments in which the reactivity of the grinding liquid is controlled to any desired degree.

Heretofore it has been necessary to leave zinc oxide pigment out of many paints and enamels using reactive grinding liquids even though the omission of the zinc oxide pigment results in the loss of desirable characteristics such as high opacity to ultraviolet light. It has also been proposed to use zinc oxide pigments of coarser crystalline structure in an effort to make them less reactive with the grinding liquid, the result being only one of degree with the reaction ultimately taking place and the paint becoming too thick for use or "hazing." Another expedient to overcome the thickening and/or "hazing" has been the use of grinding liquids which will not react with zinc oxide pigment but here again desirable characteristics are sacrificed since reactive grinding liquids frequently have the most desirable properties.

Among the many grinding liquids reactive with zinc oxide pigments may be mentioned the modified alkyds, these alkyds being alkyd resins dissolved in mineral thinners. These modified alkyds are known to the trade by such names as "Beckosol" and "Rezyl." The "Rezyl" liquid consists substantially of 40% mineral spirits and 60% of a synthetic alkyd resin known as "Rezyl." The resin comprises a mixture of 75% drying oils, for example linseed or tung oil, and 25% of a condensation product prepared by reacting a polybasic organic acid such as phthalic acid with a polyhydric alcohol such as glycerine. The Becosol vehicle is also a solution of an alkyd resin dissolved in an equal weight of mineral spirits. These two vehicles are typical of a great many modified alkyd resin vehicles used extensively in the paint and varnish industries. Any vehicle of this type is extremely reactive with zinc oxide. It is for this reason that the invention is of the highest value when used with such alkyd vehicles or other highly reactive vehicles. Since the alkyds are well known and highly reactive they will be used in the examples given hereafter though it is to be expressly understood that the present invention is not limited to any particular reactive grinding liquid.

Applicants have found that the reaction between reactive grinding liquids and zinc oxide pigments can be controlled and/or prohibited by the use of certain oxides of phosphorus and arsenic. These oxides are incorporated in the reactive grinding liquid in proper proportions. The reactivity of the grinding liquid with the zinc oxide is thereafter controlled or substantially eliminated. Among the oxides of phosphorus and aresnic which may be used for this purpose may be mentioned phosphorus pentoxide, arsenic pentoxide, arsenic trioxide and phosphoric acid.

These oxides may be incorporated in the grinding liquid either singly or in combination as may be most suitable and in determined percentages, it being noted that in many instances it may be more desirable to control the reaction between the grinding liquid and the zinc oxide pigment than to prohibit it entirely since precipitation may occur in the paint when excessive amounts of these oxides have been used.

In incorporating these oxides in the grinding liquid it is preferable to incorporate them while the grinding liquid is in a ball mill. When the oxide is thoroughly mixed in the grinding liquid the zinc oxide pigment is then ground into the grinding liquid.

The use of these oxides to control the reaction between the grinding liquid and the zinc oxide pigment has been found to be especially effective in quick drying paints such as traffic paints containing large percentages of varnish, anhydrous phosphorus pentoxide being highly effective for this purpose.

In one instance a commercial traffic paint was prepared in two batches, one without anhydrous phosphorus pentoxide or other oxide, as above described, and the other containing anhydrous phosphorus pentoxide in amount equal to 2% by weight of the zinc oxide pigment content of the paint. The first batch without the oxide inhibitor thickened to such a degree as to be worthless while the second batch including the anhydrous phosphorus pentoxide showed relatively no thickening at all.

In many cases phosphoric acid may be used in place of anhydrous phosphorus pentoxide when the water combined with the phosphorus pentoxide to form phosphoric acid is not objectionable in the paint product. Hence it is to be understood that the term "phosphorus pentoxide," as used in the appended claims, is not restricted to the anhydrous form, but that in appropriate cases as mentioned above it also includes the hydrated form, i. e., phosphoric acid.

As an example of the present invention three paints were prepared in which the pigment content was 72.1% and the vehicle 27.9%. The pigment was 80% titanium dioxide and 20% zinc oxide while the vehicle was 58.4% "Beckosol No. 1" (a modified alkyd) and 41.6% Hiflash naphtha. In the first of the paints no inhibitor was incorporated according to the present invention. In the second paint phosphorus pentoxide in amount of 6% by weight of the zinc oxide was incorporated in the vehicle while in the ball mill. The zinc oxide was subsequently ground in and the titanium dioxide then added. The third paint was similar to the second paint, arsenic trioxide being used in place of the phosphorus pentoxide.

The viscosity of these three paints was tested with a No. 4 Ford cup with the following results:

*Viscosity in seconds*

|  | Elapsed time | | | | |
| --- | --- | --- | --- | --- | --- |
|  | 0 | 4 days | 14 days | 30 days | 60 days |
| Paint #1 | 35 | 55 | 72.5 | 81.0 | 116 |
| Paint #2 | 16 | 16.5 | 17.0 | 17.0 | 16.5 |
| Paint #3 | 18 | 19.0 | 20.0 | 20.5 | 21.0 |

This table shows the reactive grinding liquid in the first paint, in which no oxide inhibitor of the present invention was incorporated, reacting with the zinc oxide pigment and resulting in a steady thickening of the paint. This table also shows how the incorporation of either phosphorus pentoxide or arsenic trioxide with the same paint in an appropriate amount may inhibit this reactivity or so control it that neglegible thickening of the paint occurs.

As another example of the use of the oxide inhibitors of the present invention two paints were prepared in each of which the pigment content was 36.7% and the vehicle 63.3%. The pigment was 90% titanium dioxide and 10% zinc oxide. The vehicle was 78.2% "Rezyl" (a modified alkyd) and 21.8% mineral spirits. No inhibitor of the present invention was incorporated in the first paint and phosphorus pentoxide in suitable amount was incorporated in the second paint. Thereafter these two paints were tested in a humidity cabinet illuminated and heated by a 100 watt bulb. The second paint containing phosphorus pentoxide showed no "hazing" or cloudiness after thirty days exposure while the first paint containing no phosphorus pentoxide exhibited bad "hazing" during the same period.

The amount of oxide inhibitor employed will depend upon the reactivity of the grinding liquid and upon the extent desired to inhibit reactivity. In most cases, and as a general rule, the inhibitor in amounts of 2% to 6% by weight of the zinc oxide may be incorporated in the grinding liquid to produce the desired results. It is to be particularly understood, however, that these percentages are not critical and while preferable in the specific paints tested are not to be considered as limiting the scope of the present invention. It is also to be understood that as little inhibitor as possible should be used both for economy's sake and to avoid settling of the paint which may occur when the inhibitor is used in excessive amounts. The amount of inhibitor to be used with a given paint may be readily determined and, while in most instances, it will fall within the given range of percentages, it may sometimes fall beyond the extremities of this range.

To determine the scope of the present invention therefore reference should be had to the appended claims.

What is claimed is:

1. In a method of conditioning paints comprising a liquid vehicle reactive with zinc oxide, the steps of incorporating at least one member of the group consisting of phosphorus pentoxide, arsenic trioxide and arsenic pentoxide in the vehicle, and thereafter adding the zinc oxide component of the paint to said vehicle, whereby the reactivity of said vehicle is reduced before it comes into contact with the pigment.

2. In a method of conditioning paints comprising a liquid vehicle reactive with zinc oxide, the steps of incorporating at least one member of the group consisting of phosphorus pentoxide, arsenic trioxide and arsenic pentoxide in the vehicle, and thereafter adding the zinc oxide component of the paint to said vehicle, the amount of said member being from 2% to 6% by weight of the zinc oxide, whereby the reactivity of said vehicle is reduced before it comes into contact with the pigment.

3. In a method of conditioning paints comprising a liquid vehicle reactive with zinc oxide, the steps of incorporating phosphorus pentoxide in the vehicle, and thereafter adding the zinc oxide component of the paint to said vehicle whereby the reactivity of said vehicle is reduced before it comes into contact with said pigment.

4. In a method of conditioning paints comprising a liquid vehicle reactive with zinc oxide, the steps of incorporating arsenic trioxide in the vehicle, and thereafter adding the zinc oxide component of the paint to said vehicle whereby the reactivity of said vehicle is reduced before it comes into contact with said pigment.

5. In a method of conditioning paints comprising a liquid vehicle reactive with zinc oxide, the steps of incorporating arsenic pentoxide in the vehicle, and thereafter adding the zinc oxide component of the paint to said vehicle whereby the reactivity of said vehicle is reduced before it comes into contact with said pigment.

6. In a method of conditioning paints comprising an alkyd resin vehicle, the steps of incorporating at least one member of the group consisting of phosphorus pentoxide, arsenic trioxide, and arsenic pentoxide in the vehicle, and thereafter adding the zinc oxide component of the paint to said vehicle, whereby the reactivity of the vehicle to the pigment is reduced before it comes into contact with the pigment.

ALWIN C. EIDE.
HARLAN A. DEPEW.